Oct. 11, 1966 F. L. WILEY ETAL 3,278,926

DIGITAL GRAPHICAL DISPLAY SYSTEM

Filed Dec. 14, 1962

5 Sheets-Sheet 1

INVENTORS.
Frank Wiley,
Eugene Seid,
Alan K. Jennings,
by Fraser and Bogucki
Albert Rosen
Attorneys Oct. 11, 1966 F. L. WILEY ETAL 3,278,926

DIGITAL GRAPHICAL DISPLAY SYSTEM

Filed Dec. 14, 1962 5 Sheets-Sheet 2

INVENTORS.
Frank Wiley,
Eugene Seid,
Alan K. Jennings,
by Fraser and Bogucki
Albert Rosen
Attorneys

DIGITAL GRAPHICAL DISPLAY SYSTEM

Filed Dec. 14, 1962 5 Sheets-Sheet 3

INVENTORS.
Frank Wiley,
Eugene Seid,
Alan K. Jennings,
by Fraser and Bogucki
Albert Rosen
Attorneys INVENTORS.
Frank Wiley,
Eugene Seid,
Alan K. Jennings,
by Fraser and Bogucki
Albert Rosen
Attorneys

DIGITAL GRAPHICAL DISPLAY SYSTEM

Filed Dec. 14, 1962 5 Sheets-Sheet 5

INVENTORS.
Frank Wiley,
Eugene Seid,
Alan K. Jennings,
by Fraser and Bogucki
Albert Rosene
Attorneys United States Patent Office 3,278,926
Patented Oct. 11, 1966

3,278,926
DIGITAL GRAPHICAL DISPLAY SYSTEM

Franklyn L. Wiley, Long Beach, Eugene Seid, Los Angeles, and Alan K. Jennings, Anaheim, Calif., assignors to California Computer Products, Inc., Anaheim, Calif., a corporation of California Filed Dec. 14, 1962, Ser. No. 244,749
23 Claims. (Cl. 340—347)

This invention relates to data processing systems, and is exemplified herein as embodied in systems and devices which present and display digital data in graphical form. The system of the invention proves especially advantageous in allowing a single digital data graphical display device to be easily used with any one of a number of different kinds and models of digital computer and related data processing systems.

It is well-known that the great majority of graphical display or recording devices currently available do not fully utilize the capabilities of modern electronic data processing systems. Full utilization of the capabilities of a high speed computer, for example, requires an output device which can record or display a wide range of continuous data, such as line plots, point-to-point plots, and the like, as well as essentially discontinuous data, such as alphabetic or numeric characters and special symbols. Most data display systems which are capable of accepting data at the rate at which it can be provided by high speed computers, however, are unduly complex and therefore unnecessary for many typical applications. There are a great many data processing operations in which it is desired to provide data in the form of a graphical record which may be analyzed and stored but which may be prepared at relatively low cost.

A common example of this typical display system application may be found in the preparation of analytical data under the control of a digital computer; the analytical data may represent, for example, events transpiring in successive stages of a chemical processing facility, with each stage having a number of different operating parameters. The variations with time in each operating parameter may be sensed and stored within the digital computer. Through appropriate programming, the computer may utilize the values of the different parameters at successive instants of time to compute one or more output values which may be much more readily interpreted than the raw input data. Thus, for example, the amount of chemical reactant developed in successive stages of the chemical processing facility may be continually monitored by analyzing a number of sensitive temperature and pressure readings; the significance of these many separate readings could not be interpreted by an operator rapidly enough to be of value except on the basis of graphically displayed computer outputs which may be easily interpreted by the operator.

Conventional output devices, such as line printers, card punches and related display systems, are not best adapted for the graphical presentation of this data as it is developed by a digital computer. It has been common, therefore, to use intermediate processing steps or devices to provide the output information as graphical plots. For example, the computer may be used to control a card punch device, and the punched cards may in turn be taken to an analog graphical recording system; the analog recording system uses a digital-to-analog converter for controlling the position of a plotting or recording member relative to a recording medium. Whether or not this intermediate step is used, a plotting member of this type has inherently analog operation, and thus is subject to problems arising from non-linearities and drift, as well as inaccuracies involved in the digital-to-analog conversion. Furthermore, such devices achieve reasonable accuracy only at great expense, and are inherently limited in the variety of graphical plots which they can render.

The difficulties of the prior art are most satisfactorily overcome by modern incrementally-driven plotting systems which may be considered to be operated directly from the computer or other data processor. Such plotting systems operate with small increments of movement, but at high rates of speed, so that they may plot patterns which are continuous or discontinuous, as desired, and which have any juxtaposition, scale, or other disposition within the physical limitations of the size of the recording or plotting medium and the recording or plotting member. The benefits of such digital incremental plotters extended far beyond the versatility of display of which the system is capable. Because the movement of the plotting member relative to the plotting medium is on a differential basis, which is to say solely by incremental movements relative to the next previous position, such plotting systems make possible complete and direct control through the use of relatively single programming routines. Such computational routines are readily standarized, in whole or in part, and at the same time readily altered to permit changes of scale, insertion of new symbols or characters, and the use of error checking routines through the aid of the plotted graphical record.

Such digital incremental plotters are desirably made relatively inexpensive, simple, and reliable. They are not especially adapted to accept data from any one of a wide range of processing systems, because such adaptations would invariably tend to multiply the complexity and cost of the plotters. Furthermore, many computers and data processing systems are designed to operate in a manner requiring an exchange of signals or the observation of special timing relationships between the data processing system and an associated output device or system. These signal exchange requirements are normally unique for each type or model of computer or data processing system. It is of course essential that the use of an incremental plotting system not impose any special requirements on the programming, operation, or use of the data processor, or any material modification of the arrangement or circuitry of the data processor. Accordingly, there exists a need for an adaptation means which is capable of unifying and combining the parts and function of a computer or other data processing system with that of a digital incremental plotting system, utilizing the existing characteristics of each to the best advantage, but without changing the structure or principle of operation of either. Such an adaptation means should provide compatibility between the rates of operation of the data processing and plotting systems, and adjust the wave shapes, signal levels and timing relationships of the signals interchanged between the associated systems so that there is no reduction in reliability. Further, it may be necessary to permit a computer to use maximum calculating time, operating essentially independently of the plotting system after a command has been given to the plotting system. The instructional commands for the plotting system should be converted from the format of the computer to a different format which can be accepted by the plotting system, and the wave shape, signal level, and timing relationships should be adjusted as well. The foregoing requirements become even more stringent if a number of independent plotting systems are to be simultaneously or independently receptive of graphical-data-representing-signals from a single computer.

It is therefore an object of this invention to provide improved graphical data presentation systems for digital data processors.

A further object of this invention is to provide means for achieving cooperation between a digital incremental plotter and a digital computer, which means permits the computer to drive the plotter directly but without substantial modification of either the computer or the plotter.

Systems in accordance with the present invention achieve these and other objects by variably controlling the plotting motions of a digital incremental plotter through combinations of unique movements derived from individual binary-coded representations provided from the computer. Means are additionally provided for effecting positive control of the plotter and for synchronization of the various plotter operating mechanisms, while rapidly releasing the computer for further calculations.

In one specific example of a system in accordance with the invention, commands are provided from a computer for a digital incremental plotter, in such a fashion as to require synchronization of the rates of operation of the computer and the plotter. Means are provided to retain the commands for the plotter for energizing the three plotting axis mechanisms (one mechanism for each plotter axis of operation), while additionally returning a control signal to the computer to quickly release the computer for calculation during the principal part of the interval required to operate the plotter mechanisms. A successive plotter operating command is not transferred to the plotted mechanisms, however, until completion of a variable time interval which is determined by the command itself. The X and Y axis mechanisms, and the relatively slower Z axis mechanism, are thereby operated at their maximum rates automatically. Similarly, the computer can utilize a maximum of calculating time between plotter commands. The computer is furthermore enabled to use its conventional output characters to directly control the plotter, and to operate from standardized programs without internal computer or plotter modification.

In another specific example of a system in accordance with the invention, the same functions are performed, but the commands provided by the computer are effectively stored by the computer itself.

Yet another system in accordance with the invention derives output signals from a triggered output device within a computer, and utilizes these signals directly to control the input circuits of a plotter while concurrently turning off the triggered output device. All these systems are characterized by economy of parts and high reliability.

Systems in accordance with the invention further provide means for using a number of plotters in cooperative relationship with an individual data processing system. The individual plotters are not only selected, but data is transferred in correct fashion and proper timing relationships are maintained during high speed operation.

A better understanding of the invention may be had by reference to the following description, taken in conjunction with the accompanying drawings, in which.

Figure 1:
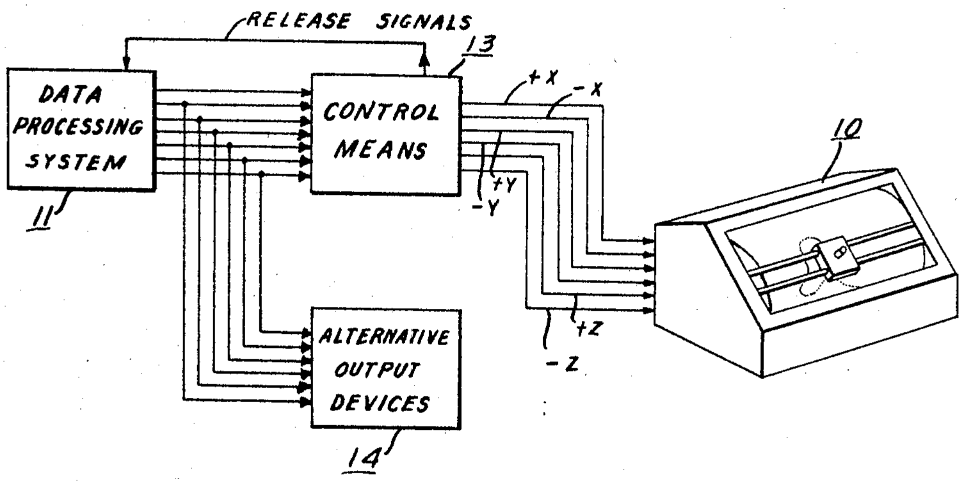
FIG. 1 is a block diagram representation of the organization of a unified system including a computer and digital incremental plotter, and conjointly operating control means.

The diagram of FIG. 1 shows the general arrangement of a complete system for preparing graphical records of an arbitarary nature with an incremental digital plotter 10. Although the plotter may be used for other purposes, and with other equipment, this arrangement nevertheless forms of a unified and coordinated system, with the plotter 10 cooperating with specially organized output information derived from a data processing system 11. There are no restrictions on the data processing system 11, so as to the data which it can process or the routines which it can perform, except insofar as these derive data which is to be used in controlling the plotter 10. At appropriate sequences or at appropriate times, however, for best utilization of the plotter 10 the data processing system 11 must provide the proper commands for the plotter 10. Through the use and operation of the control means 13 these plotter instructions may be provided in the form which is most convenient for the data processing system.

The program which is prepared for the data processing system 11 itself will vary widely in form, depending upon the nature of the plot which is to be prepared and the type of system which is used. This is far from a disadvantage, however, because the graphical output can be positively controlled in the course of preparation of the program material, which itself may be standardized. With a digital incremental plotter, this program material must include instructions for the incremental variations to be made at the plotting instrument. Data processing systems, of course, vary is as to the coding formats they use and the nature of the output signal patterns which are most readily generated thereby. The great majority of such systems provide binary or binary coded decimal patterns which are eminently suitable for the control of a digital incremental plotter 10. The data processing system 11 may require release signals from the associated input/output equipment, in order to continue processing. These signals are here provided by the control means 13.

It is obviously preferable to be able to use a digital incremental plotter 10 for a variety of other purposes as well as in conjunction with a data processing system 11. Special alternative output devices 14, such as printers, card punches, and magnetic tape transports, may be employed for the preparation of most output information, and while the digital incremental plotter is not a special purpose device it is not intended for the high volume work which these other specialized output devices are utilized for. A digital incremental plotter may be used in conjunction with separate tape transports, laboratory instruments, and in a variety of other ways, because by its nature it requires a minimum of data conversion equipment. Accordingly, the digital incremental plotter in its usual form cannot be utilized to provide buffer storage of characters, code conversion, timing control or other cooperative signals, such as the release signals for a data processing system.

The digital incremental plotter requires, as shown, six basic command signals in a form suitable for charging the input capacitors which control each of the six different operating functions of the plotter. In typical high performance plotters, the plot commands are on the X axis in the +X or −X direction (paper advance or reverse), on the Y axis in the +Y or −Y direction (recording pen movement to the right or left), and on the Z axis in the +Z or −Z direction (pen down and pen up respectively). These signals cause the pen to move in 1/100 or 1/200 inch increments (dependent upon the system) relative to the record paper, and at operating speeds of 200 steps per second or 300 steps per second. Such systems additionally must account for a number of other timing relationships. Note that all individual X and individual Y commands may be given simultaneously, so that the pen may move at 45° angles relative to the paper, as well as in each of the four coordinate directions. During such movements, however, the pen should previously have been set up or down depending upon whether it is desired to move to a new position without recording an increment or series of increments. The pen movement is necessarily slower than the incremental rate of movement along the X and Y axes, and is limited to 10 up or down motions per second. With the plotter in the normal operating position shown in FIG. 1, the various commands may also be referred to as paper up/down and pen right/left directions, as well as pen up/down directions.

Graphical recording systems in accordance with the invention utilize a control means which uniquely unifies one or more digital incremental plotters to a data processing system, permitting the plotter to be slaved to the data processing system but without change in the plotter. Except for the program prepared for the data processing system, the system remains entirely free to control the alternative output devices.

Figure 2:
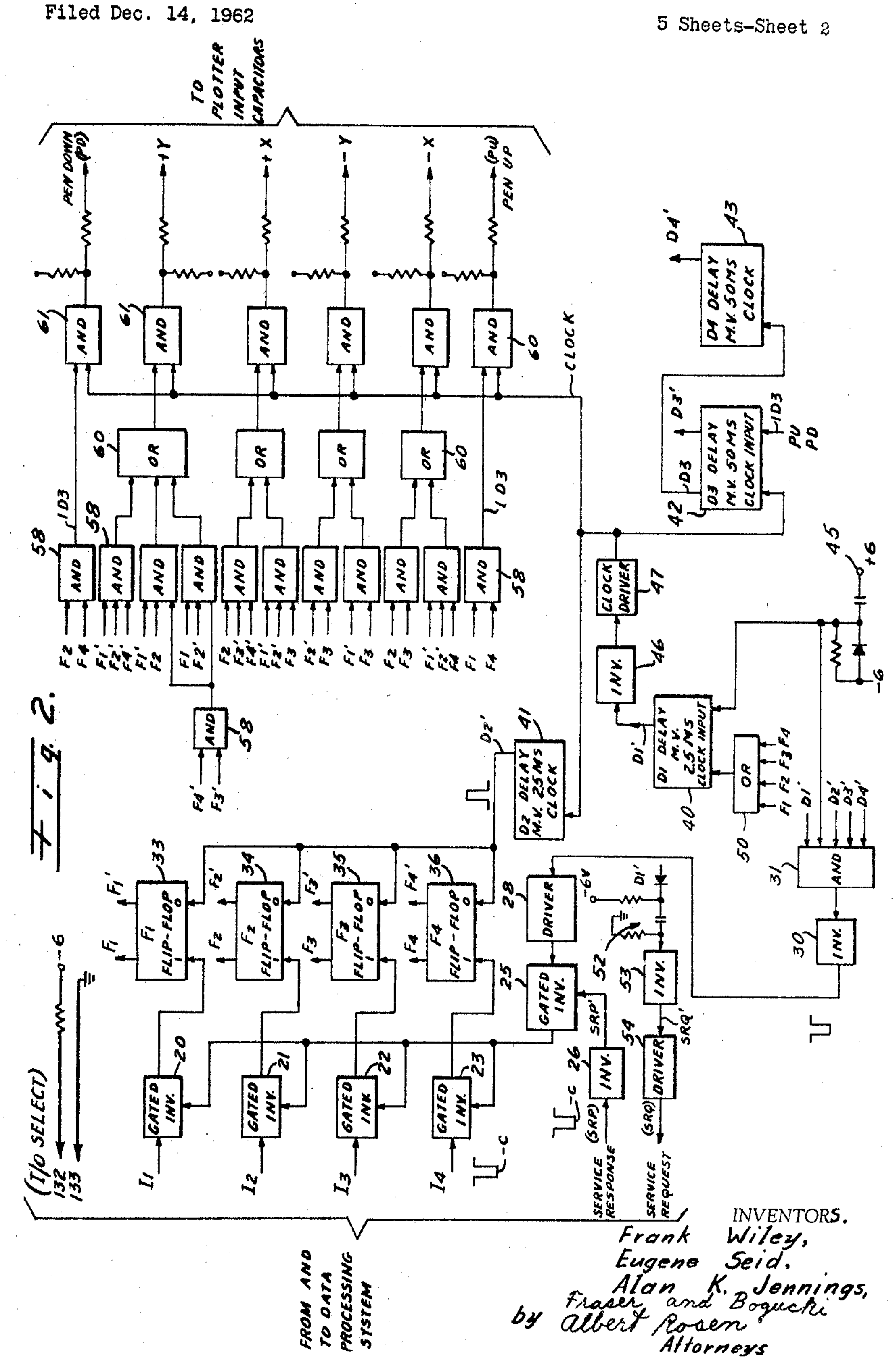
FIG. 2 is a partial block diagram and partial schematic circuit of one example of a control means which may be utilized in the arrangement of FIG. 1, in conjunction with a first type of computer.

FIG. 2 is an illustration of one form of control means in accordance with the invention, used specifically for the integration of an incremental digital plotter with the type 1401 medium scale general purpose computer manufactured by the International Business Machines Corporation, New York, N.Y. This affords a good example of how compatibility between systems is achieved, although full versatility in the preparation of graphical displays is retained.

A 1401 system provides signals at a basic character rate of 86 kilocycles per second. These characters are usually supplied on seven data lines, in a seven bit binary coded decimal format and one character at a time. Note that such a coding scheme is not convenient for direct control of the six alternative control commands for the digital incremental plotter. In addition, the 1401 system imposes certain signals and timing requirements which must be met unless the system is to undergo costly and difficult modification. The system includes a control panel with an input-output (I/O) terminal set to which output devices may be connected. The operation of the IBM 1401 system is controlled by an internal clock circuit which is automatically locked up whenever a character is provided to the associated output device. The clock must be released by the output device in order for further computing cycles to be commenced. Output characters, however, are not continually presented by the 1401 system for driving the output device. Therefore, any associated equipment must cooperate with the 1401 system both as to data transfer and time rate control. The wide discrepancy in rates between the operating rate of a typical output device, such as a digital incremental plotter, and the clock rate of the 1401 system, together with the fact that the timing relationships vary (depending upon the X, Y and Z commands) with the digital incremental plotter, makes the timing and data transfer problem even more difficult.

Inasmuch as the IBM 1401 system is well-known and widely used, its details and arrangements need not be further described here. In the use of any input/output equipment with the IBM 1401, jumper connections obvious to those familiar with the system are made at the control panel to insure proper operation in the output mode.

With a digital incremental plotter coupled by a control means such as shown in FIG. 2 to an IBM 1401 system, the plotter is selected for output operation by the programmer, and the system is programmed to provide instructions for any of the ten different possible movements of the operative elements of the plotter. The four binary-valued output lines of the 1401 are related to the binary coded decimal characters and the plotter movements in the following way:

| System Output Lines | | | | | | | BCD No. | Plotter Movement |
|---|---|---|---|---|---|---|---|---|
| P | B | A | 8 | 4 | 2 | 1 | | |
| X | X | X | 1 | 0 | 1 | 0 | 0 | Pen Down |
| X | X | X | 0 | 0 | 0 | 1 | 1 | +y |
| X | X | X | 0 | 0 | 1 | 0 | 2 | +y, +x |
| X | X | X | 0 | 0 | 1 | 1 | 3 | +x |
| X | X | X | 0 | 1 | 0 | 0 | 4 | −y, +x |
| X | X | X | 0 | 1 | 0 | 1 | 5 | −y |
| X | X | X | 0 | 1 | 1 | 0 | 6 | −y, −x |
| X | X | X | 0 | 1 | 1 | 1 | 7 | −x |
| X | X | X | 1 | 0 | 0 | 0 | 8 | +y, −x |
| X | X | X | 1 | 0 | 0 | 1 | 9 | Pen Up |

In the above table, a "1" indicates an output pulse, while a "0" indicates the absence of an output. The computer may be operated in the "continuous" mode, in which individual successive output indications are prepared and stored in a series, or in the "single character" mode, in which separate computations are made as successive points are plotted.

In the system of FIG. 2, conventional circuits may be used for the different basic circuit components, such as inverters, flip-flops, and gates. Parts of the circuits are shown in some detail because the circuits and relationships used contribute to reliable and economical performance of the required functions. It will be recognized, however, that a great many variations using conventional circuitry and logical arrangements of other types may be employed within the scope of the invention.

Input signals to the control means of FIG. 2 are provided as negative-going pulses in a binary coded decimal format on the various ones of four input lines coupled to a number of gated inverters, 20, 21, 22 and 23 which form part of a trigger interlock circuit. Three other sets of connections are also made from the control means to the 1401 system. One of these is directly from the negative power supply to the "I/O select" plug. Other connections are made to receive input signals from the 1401 on the "service response" (SRP) line, and to provide output signals to the system on a "service request" (SRQ) line. The remaining terminals of the 1401 system are jumpered in a fashion obvious to those familiar with such systems, enabling the system to accept the Service Request signal to effect operation in the single character and continuous output modes as determined by the programmed commands of the system.

The gated inverters 20 to 23 are gated on by SRP signals provided concurrently with the data signals. It has been found convenient to achieve the gating by controlling the emitter circuits of transistor inverters. The inverters are held non-conducting in the absence of both data characters and SRP signals by coupling a negative voltage supply (hereinafter −C) to the emitters of the transistors. A −C voltage level signal pulse is applied to the inputs of the inverters 20 to 23. The SRP signal is used to generate a gating control pulse which effectively grounds the emitters of the transistor inverters 20 to 23. Positive-going output signals are then provided at the output terminals of each of the inverters 20 to 23 which received an input data pulse. The application of this gating control pulse to the inverters 20 to 23 is dependent upon a number of other logical signal terms, which are used to insure that data pulses will not be received by the control means unless the system is ready to receive a plotting instruction.

To this end, a gated inverter circuit 25 is coupled in the fashion of the previous inverters, with control inputs being derived representative of the SRP term through an inverter 26, and signal inputs being derived through a driver circuit 28 from an inverter 30. An "AND" gate 31 coupled to the inverter 30 is fully actuated upon concurrent application of signals designated D1′, D2′, D3′, D4′, and R. The D1′ and like terms represent the states of various delay elements described below. The R term represents the stage of a start circuit which is actuated, and remains actuated, when the system is turned on. Thus, at the gated inverter circuit 25, each of the signals must be present together with the SRP term before the gated inverters 20 to 23 will be rendered conducting and input data signals will be passed to set associated data flip-flops 33–36.

The data flip-flops 33, 34, 35 and 36 are designated for convenience with the terms F1, F2, F3 and F4, with the "1" state of a flip-flop designating that the "1" term is "true." All of the data flip-flops 33 to 36 are initially set to their "0" states when power is first applied, and are thereafter set to like states after the reception and use of each succeeding character. The data flip-flops 33 to 36 not only store the characters for use by the digital incremental plotter, but are used in the recognition of timing sequences appropriate to each plotter instruction, and in the conversion of signals to appropriate signals patterns for controlling the plotter.

Timing functions within the control system are principally developed by a group of four one-shot multivibrators, which are termed delay multivbrators 40, 41, 42 and 43 and identified as D1, D2, D3 and D4 respectively for convenience. The D1 and D2 delay multivibrators 41, 42 each provide a 2.5 milliseconds (ms.) delay interval, while the D3, and D4 delay multivibrators 42, 43 each provide a 50 ms. delay. The coupling and use of each of these delay devices are described separately below.

The various delays include clock terminals as well as input terminals, and complementary output terminals, such as D1′, as well as normal output terminals (D1). The active or "ON" period of a delay multivibrator is defined by the "true" state of its normal output which is represented by a rectangular pulse of 2.5 ms. duration for the D1 and D2 delays 40, 41. Positive-going and negative-going pulse edges may also be used, however, to generate shorter clock or driving pulses in conventional ways at the beginning or end of an active period. Thus, when triggered by an input signal at the clock terminal, the multivibrator will shift to its "ON" state, maintaining that state for the specified interval. When the multivibrator shifts back to the "OFF" state, at the trailing edge of the "true" pulse on its normal output terminal, an output pulse may be derived from the "true-false" transition of D1 in order to clock associated circuits. To this end, a differentiating circuit may provide clocking pulses to trigger a monostable multivibrator by using the trailing edge of another delay pulse. Application of an input signal to the input terminal of the D1 delay multivibrator forces the multivibrator into its "true" state, whether or not a clock input is present. When an input terminal is shown as connected, as with the D3 delay, an input signal must be provided before the application of a clock input will trigger the delay multivibrator.

It will be recognized that other arrangements of logical circuits, such as "AND" gates at the input terminals of the delay multivibrators, may be used for achieving these results. The circuit arrangements shown, however, have particular economy as well as utility in the performance of multiple functions with a minimum of components. The D1 delay 40, for example, performs a number of functions in the system. Initially, upon the application of power, a +6 volt supply 45 is coupled to the input of the D1 delay 40, forcing this multivibrator "on" for the 2.5 ms. interval, and providing a clock pulse on the D1′ output terminal thereafter. This pulse, after passage through an inverter 46 and the clock driver 47 is applied to the clock input of the D2 delay 41, and thereafter a clock derived at the beginning of the D2 period is applied to set all of the data flip-flops 33 to 36 in their "false" states.

Once power is turned on, it remains on and the D1 delay 40 is continuously conditioned for clock pulses. The clock input to the D1 delay 40 is supplied by a pulse from an "OR" circuit 50 which is activated by any one of the F1, F2, F3 or F4 signals. Thus, whenever one or more of the data flip-flops 33 to 36 has been set to its "true" state, the D1 delay 40 is clocked.

The D2 delay is clocked only in response to previous actuation of the D1 delay 40, and at the end of the D1 interval. The D3 delay 42 and the D4 delay are, however operated under different conditions in response to the clock pulses. The D3 delay 42 must be conditioned by a 1D3 signal derived from the conversion circuitry. The 1D3 signal is generated whenever a pen movement, up or down, is to be initiated, as indicated by PU and PD signals. The trailing edge of the D3 pulse clocks the D4 delay 43, providing a subsequent output pulse from the D4 delay 43 for a 50 ms. interval.

The states of the various delays 40 to 43 control the trigger interlock circuit through the "AND" gate 31, the inverter 30 and the gated inverter circuit 25. If any of the D1–D4 delays is in the "true" state the complementary signal (e.g. D1′) is "false" and so the control signal to the inverters 20 to 23 is terminated because the "AND" gate 31 is deactivated. Thus, following initial generation of a clock in the D1 delay 40, the gated inverters 20 to 23 are turned off for a variably controlled length of time before they will permit another gated character to be passed into the data flip-flops 33 to 36. The relationship of these timing sequences to the actual data characters is discussed in greater detail below.

The control means performs other timing functions for the plotter and the computer by controlling the SRQ signal in response to the D1′ signal. The SRQ signal is normally supplied to the 1401 system from an RC circuit 52 through an inverter 53 and a driver 54. The SRQ signal is terminated, however, whenever the capacitor of the RC circuit 52 is discharged momentarily by termination of the D1′ signal. This interruption is for a time interval determined by the time constant of the RC circuit 52, which is here about 20 microseconds.

The data conversion circuitry 56 which is utilized with this arrangement operates solely in response to the clock from the D1 delay 40 and to the data signals derived from the data flip-flops 33 to 36. The conversion circuitry 56 is connected directly to the plotter input capacitors within the digital incremental plotter. In conventional fashion, the conversion circuitry 56 includes a group of "AND" gates 58, the input terminals of individual ones of which are coupled in different patterns to the output of the various data flip-flops 33 to 36. These "AND" gates 58 identify the individual X, Y and Z axis control signals, from the data presented on the four input terminals which are coupled to the 1401 system. The four X and Y axis signals are combined from the different "AND" gates 58 in "OR" circuits 60. The control signals in the six different output lines are clocked together at the same time by a separate output "AND" gate 61. Output resistive networks are used for providing charging currents to the plotter input capacitors.

Figure 3:
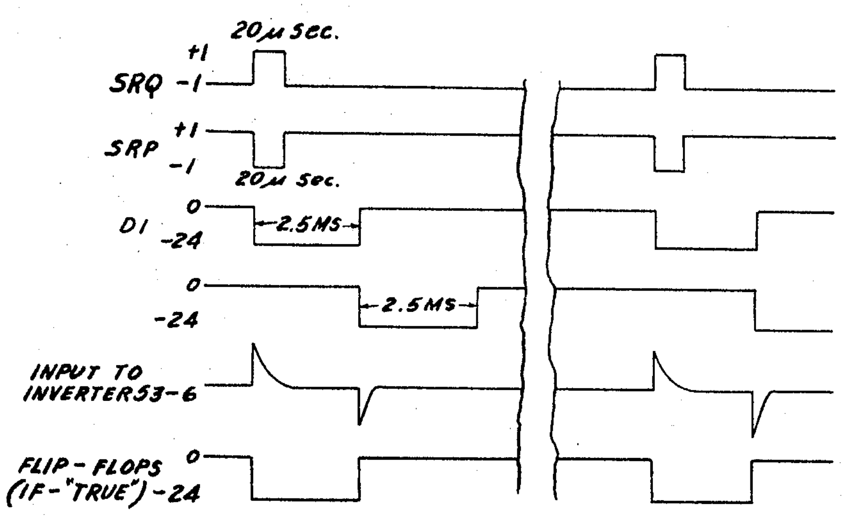
FIG. 3 is a timing diagram showing various waveforms provided in the operation of the system of FIG. 2.

In operation, the system of FIG. 2, as shown additionally by the waveforms in the timing diagrams of FIG. 3, synchronizes the operation of the plotter with the 1401 system, and assures proper transfer of data from the 1401 system to the plotter in a form directly suitable for controlling the plotter. Once power is applied, as previously described, the clock pulse from the D1 delay 40 triggers the D2 delay 41 which sets all the data flip-flops 33 to 36 in the "0" or "false" states. Once these flip-flops have been set, none of the delays 40, 41, 42 or 43 is in its "true" state, so that a signal is provided to the gated inverter circuit 25 and the system is ready to receive a data character. Until a data character is provided, however, the SRP signal is not present and the gated inverter circuit 25 does not actuate the gated inverters 20 to 23 in the trigger interlock circuit 25. Accordingly, the system will not accept erroneous data indications, if any should exist because of noise, signal transients or power supply variations. When a correct data character in BCD form is presented, it is accompanied by the SRP signal from the 1401 system, and immediately registered in the data flip-flops 33 to 36 through the gated inverters 20 to 23. Concurrently with the entry of the data character, the various timing sequences are begun, initially by virtue of the clocking of the D1 delay 40, which results from the change of state of at least one of the data flip-flops 33 to 36. The presence of one "true" term in the data flip-flops 33 to 36 then results in the application of a clock signal to the D1 delay 40 through the "OR" circuit 50.

For the first 2.5 milliseconds after the D1 delay 40 is clocked, the D1' signal at the input to the "AND" gate 31 which ultimately controls the trigger interlock circuit is terminated, and the gated inverters 20 to 23 are opened to prevent the passage of any further data characters. The system clock is provided at the end of this first 2.5 ms. interval from the D1' output terminal to the conversion circuitry 56 and also to the D2 delay 41 and the D3 delay 42. The combination of "AND" gates 58, "OR" circuits 60 and "AND" gates 61 provide appropriate incremental commands for the plotter at this point in time.

Let it be assumed first that, as will usually be the case, the plotting instrument will be started at some reference position relative to the recording medium, and in the "pen up" position along the Z axis. In a typical case, X and Y commands will be given individually and simultaneously as needed to move the plotting instrument to some starting point relative to the record medium. An initial sequence of characters for beginning this action would thus be provided, in the assumed case. Thus, the Z axis command will be given until the point at which the plotting is to start will have been reached, and the D3 delay 42 will not be activated by the application of the 1D3 input signal at its input terminal. During this time therefore, three successive events will take place, for each data character, following the entry of the character into the data flip-flops.

Substantially concurrently with the entry of the data character, the D1 delay 40 will be clocked, setting the D1 term "true" and discharging the RC circuit 52 to begin the 20 microsecond interval in which an SRQ signal is not provided. When the RC circuit 52 is recharged after this interval and the SRQ signal returns, the SRP signal is terminated by the 1401 system, and the 1401 system again begins computations for the next plotting point, if in the single character mode. Thus, at the 86 kc. character rate of the 1401 system, very few cycles are lost before the 1401 system clock is again unlocked, and the next plotting operation may be continued independently of the computing operation until the next data character is made available. A new data character will not be accepted, however, until sufficient time has elapsed for the incremental plotting movement to have been completed. With solely X and Y movements at a rate of 200 steps per second, the total 5 ms. delay provided by the D1 delay 40 and the D2 delay 41 in series is sufficient. Accordingly, the clock which returns all of the data flip-flops 33 to 36 to their "0" states also operates the gated inverters 20 to 23 in the trigger interlock circuit, because the D1', D2', D3', D4' and the R signals are all present at the inputs to the "AND" gate 31. Therefore, when a data character (along with the SRP signal) is provided, it will be set into the data flip-flops 33 to 36.

If a different plotter speed is utilized, such as one having 300 steps per second on the X and Y axes, the delay intervals provided by the D1 delay 40 and D2 delay 41 are simply reduced correspondingly.

The movements of the plotting instrument up and down on the Z axis are generally less frequent than the movements on the X axis, but are carried out at the slower rate of 10 movements per second. Accordingly, 100 milliseconds is required before a new character can be accepted, and this delay is provided by successive actuation of the D3 delay 42 and the D4 delay 43 in response to the clock from the D1 delay 40. The D3 and D4 delays 42, 43 respectively requires the provision of the 1D3 signal to the input terminal of the D3 delay 42, to represent pen up or pen down instructions. After initial application of the clock, the D3' and D4' terms at the inputs to the "AND" gate 61 which controls the trigger interlock circuit together define the 100 ms. interval, thus preventing acceptance of another data character. Note however, that the other signal sequences are carried out at the same rate. That is, the commands are clocked into the plotter input capacitors upon application of the initial clock to the "AND" gate 61, and the data flip-flops 33 to 36 are reset to the "0" states at the same time. Additionally, the SRQ signal is terminated for the 20 microsecond interval following the initial clocking of the D1 delay 40.

Figure 4:
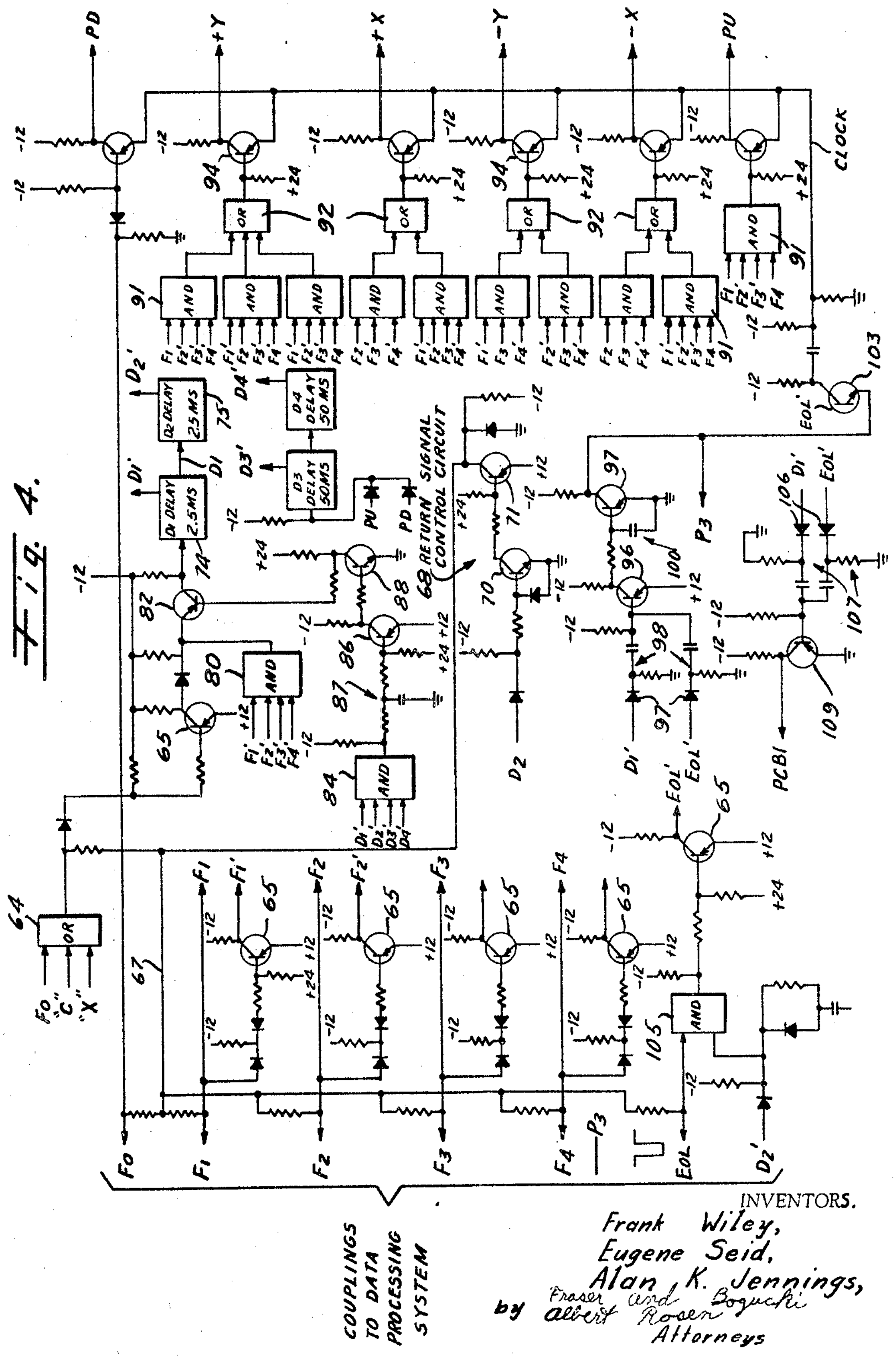
FIG. 4 is a combined block diagrams and schematic circuit representation of a second form of control means which may be employed in the arrangement of FIG. 1 in conjunction with a second type of computer.

A different arrangement in accordance with the invention, as employed in conjunction with a type 1620 system manufactured by the International Business Machines Corporation, is illustrated in the diagram of FIG. 4. Here again, neither the computing system nor the plotter requires any modification whatsoever, but the control means operates both to best advantage in a cooperative relationship.

Data outputs from the IBM 1620 system are provided in BCD form on five input lines to the control means, designated F0 to F4. A "false" value is normally indicated on these lines by the application of a +24-volt signal. The output connections from the 1620 system also include C, X, and EOL lines, which are also normally held at +24 volts to indicate the "false" state. The control means and plotter do not utilize these latter signals, but as will be understood by those familiar with the system, the output device must respond to the signals when they occur. The EOL term corresponds to a record mark in the format utilized in the 1620 system, and is provided at the termination of a write command following an individual character or field of characters. The 1620 system also includes silicon controlled rectifiers (hereinafter SCR) in the output circuits which are coupled to the control means. Data signals provided by the 1620 system to the SCR's are converted to output indications when the SCR's are fired, for transfer of data through the control means into the plotter. Following firing, the SCR's are extinguished, in order to be able to receive new data characters. The present system utilizes and controls the storage function of the SCR's for the orderly transfer of commands to the plotter.

As previously described, the 1620 system is programmed to output a BCD character for each step of plotter movement. The control means instructs the 1620 system to wait while providing consecutive output characters until a time sufficient for the execution of the particular command has elapsed. This applies to both the X and Y commands (e.g. 200 steps per second) and the relatively slower recording instrument commands (e.g. 10 movements per second). If the 1620 system is operating in a single character mode, each character is followed by a record mark (EOL), and the control means responds to this state by activating the computer for further computations as determined by the program. Appropriate adjustment of the time delays is all that is required for a plotter having different operating speeds from the examples given.

The BCD characters provided from the 1620 system result in ten possible different plotter movements, as described in conjunction with the 1401 system control means, and in accordance with the following code:

| C | X | 8 | 4 | 2 | 1 | 0 | BDC No. | Plotter Movement |
|---|---|---|---|---|---|---|---|---|
| X | X | 0 | 0 | 0 | 0 | 1 | 0 | Pen Down |
| X | X | 0 | 0 | 0 | 1 | 0 | 1 | +Y |
| X | X | 0 | 0 | 1 | 0 | 0 | 2 | +Y, +X |
| X | X | 0 | 0 | 1 | 1 | 0 | 3 | +X |
| X | X | 0 | 1 | 0 | 0 | 0 | 4 | −Y, +X |
| X | X | 0 | 1 | 0 | 1 | 0 | 5 | −Y |
| X | X | 0 | 1 | 1 | 0 | 0 | 6 | −Y, −X |
| X | X | 0 | 1 | 1 | 1 | 0 | 7 | −X |
| X | X | 1 | 0 | 0 | 0 | 0 | 8 | +Y, −X |
| X | X | 1 | 0 | 0 | 1 | 0 | 9 | Pen Up |

The complements of the input signals are generated by application of these input signals to transistor inverters 65 through conventional biasing arrangements which need not be described in detail. Taking an inverter 65 which is coupled to the F2 input line, it may be seen that the collector of the PNP type transistor is normally maintained at a −12 volt level when the transistor is nonconducting, as is the case when a +24 volt input signal indicating a "false" state is present on the F2 line. Thus the −12 volt output signal at the collector of this transistor 65 represents the "true" state for the F2′ term. When the F2 input line goes "true," it is dropped to ground potential, turning on the transistor 65, and bringing the collector voltage to a +12 volt level, to charge the F2′ term to the "false" state.

Control of the SCR's external to the 1620 system is effected by using a common supply line 67 coupled to each of the terminals from the 1620 system and operative to switch the output terminals of the SCR's from +24 volts to 0 volts, dependent upon the timing relationships existing in the control means. The SCR's are coupled to the line 67, and the +24 volt signal is provided by a return signal control circuit 68. At such times as the +24 volt level is present all SCR's to which "1" data signals have been applied will fire and thereafter remain conducting, until the voltage on the line 67 is reduced to a 0 volt level.

The return signal control circuit 68 provides a +24 volt signal on the conductor 67 when the D2 term is "false," as described in more detail below. In the absence of the D2 signal, an NPN driver transistor 70 is held conducting, turning on a coupled PNP transistor 71, the voltage of the collector of which is used as the supply for the line 67. Thus the SCR's of the 1620 system are controlled externally to that system.

The timing control signals derived from the control means of FIG. 4 are generated by a group of delay multivibrators 74, 75, 76, and 77, designated to correspond to the D1 to D4 delays of the FIG. 2 system, and operating similarly thereto. As in that system, the entry of a data character is signified by a "true" signal on at least one of the input lines, designated F0 to F4. In this instance, a negative logic is used, employing an "AND" gate 80 which is coupled to receive the F1′, F2′, F3′ and F4′ signals from the input transistors 65. Actuating signals may also be derived from an "OR" circuit 64 which receives the F0, "C" and "X" signals. As soon as one of the F1′ to F4′ signals indicates that a data character is present by switching to the "false" state or +12 volt level, a corresponding output signal is provided from the "AND" gate 80. In the absence of a control signal on its base, as described below, a trigger interlock transistor 82 couples this +12 volt input signal to the D1 delay 74, triggering that delay to provide the D1 "true" signal for its selected 2.5 ms. period. At the end of this interval, the D2 delay 75 is next triggered in its turn.

The trigger interlock transistor 82 is shifted between the conducting and non-conducting states by signals applied to its base under control of an "AND" gate 84 which is governed by the states of the various D1 to D4 delays 74 to 77 respectively. When none of these delays are clocked to their active states, the D1′ to D4′ signals are concurrently provided to the "AND" gate 84. The base of the trigger interlock transistor 82 is held at substantially ground potential and the transistor 82 conducts. When any one of these input terms goes "false," however, the signal returns to a +12 volt level, driving the base of a first inverter transistor 86 to +12 volts through an RC circuit 87. This voltage cuts off the first inverter transistor 86 and drives the base of a second inverter transistor 88 negative to approximately −12 volts. The first inverter transistor 86 is of the PNP conductivity type and the second is of the NPN conductivity type, so that both are driven non-conducting by the stated input condition. Output signals taken at the collector of the second inverter transistor 88 in this state are approximately +24 volts. The rise in the input level at the trigger interlock transistor 82 causes it to cease conducting and blocks passage of further input signals to actuate the initial D1 delay 74 until all other delays (D2, D3, D4) have returned to a quiescent state. The RC circuit 87 at the input to the first inverter transistor 86 functions to provide a time delay of approximately 100 microseconds in turning on the transistors 86, 88 subsequent to the time at which all the D′ input signals to the "AND" gate 84 have returned to the "true" state and the −12 volt level.

The conversion circuits 90 utilized with this arrangement include a first group of "AND" gates 91, which receive the input data signals on the F1 to F4 and F1′ to F4′ lines, and couple these together into the desired logical indications to provide selection of the individual plotter commands, as shown. Like plotter commands are united in a group of "OR" circuits 92, each of which is coupled to the appropriate plotter input capacitor through an output inverter transistor 94 having a collector resistor 95. A plotter input capacitor discharges through its coupled collector resistor 95 whenever a data signal representing a "true" term is applied at the base, and a clock signal is concurrently applied at the emitter circuit, of the associated output transistor 94.

The output transistors 94 are coupled to perform the clocking function in response to clock signals coupled into the emitter circuits of each of the transistors 94, by a line which is normally held at a −3 volt level. In the presence of a data character, the clock is generated in proper time relationship, swinging the voltage level at the emitter circuits of the transistors 94 to the +3 volt level. Concurrent application of the +3 volt clock signals to the emitter circuits and the input signals to the base circuits of the transistors 94 provides +3 volt command signals to the appropriate plotter input capacitors.

The clocking of the commands to the plotter occurs simultaneously for both the X and Y axes and the Z axis, and takes place at a selected time after the initiation of transfer of a data character. Generation of the clock is begun when the D1 term goes "true" and the D1′ term concurrently goes "false" by a change of the D1′ output signal from the −12 volt level to the +12 volt level. In the quiescent state, both the D1′ and the EOL′ (described below) terms are "true," and the signals hold the base of a PNP conductivity type transistor 96 at a −12 volt level, causing the transistor 96 to conduct. When either D1′ or EOL′ goes "false," however, the resultant pulse edge is passed through an isolating diode 97 and a differentiating circuit 98 and causes the transistor 96 to be turned off for a length of time determined by the differentiating circuit, the time here being about 30 microseconds. A coupling from the collector of the transistor 96 to the base of a second PNP type transistor 99 is made through a passive circuit 100 which here provides approximately 15 microseconds delay. The signals at the collector of this second transistor 99 are normally at −12 volts, as the transistor is maintained nonconducting. The application of the 30 microsecond pulse, 15 microseconds after the D1′ state goes "false," returns this output signal to ground briefly by turning on the second transistor 99 for the 30 microsecond interval.

This signal, designated P3, is returned to the 1620 system, and is also used for generating the clock. To this end, the collector circuit of the transistor 99 is directly coupled in the emitter circuit of another transistor 103 having an output which is coupled to the clock line. A control signal for the base of this transistor 103 is derived from the EOL′ output which is normally "true" when the D1′ signal goes "false," and holds the transistor 103 conducting to permit direct control of the output by the P3 signal. When the P3 signal level is pulsed to ground in response to a data pulse, therefore, the output signal from the transistor 103 (which acts as the clock) is driven in a positive-going direction, clocking all of the output transistors 94 simultaneously. The commands derived from the conversion circuits thereby discharge the respective plotter capacitors to cause execution of the plotter commands.

The system must also respond to the EOL signal provided from the 1620 system at the termination of a write command. The response is made very rapidly, and without triggering the various delays or the clock. The EOL′ term is normally held true at the input inverter 65 and thus maintains −12 volts at the input circuit of the transistor 96 which is used to initiate the clock pulses. The EOL signal is provided to this transistor 65 through an "AND" gate 105 which is also coupled to receive the D2′ signal. Indication of the EOL "true" state is made by driving the EOL line to ground from the normal +24 volt level, while the D2′ input terminal is held "true" at the −12 volt level. The D2′ term is here employed as a safety measure, to insure that a false EOL term is not generated to actuate the system during the D2 interval, at the start of which the SCR's are first turned off and following which they are fired.

The EOL′ signal, in going "false" therefore acts to generate a 30 microsecond pulse which is passed with 15 microseconds delay through the transistors 96, 99 to represent the P3 signal for return to the 1620 system. The EOL′ term being "false," the coupled transistor 103 is turned off, preventing the P3 signal from being passed through to act as a clock at the conversion circuits 90.

The 1620 system also utilizes a PCB1 signal following the entry of each command or the provision of each EOL signal, to cause the system to return to further computations or to read another character in for command of the plotter. The PCB1 signal is generated from the D1′ and EOL′ signals, and like the P3 signal is initiated in response to these terms going "false." The signals are coupled in through respective diodes 106 and differentiating circuits 107 into the base of a transistor 109, with the PCB1 output signal being taken at the collector of this transistor 109. With the D1′ and EOL′ terms being normally "true," this constitutes an "OR" circuit arrangement which cause the PCB1 signal conductor to be pulsed to ground for a normal −12 volt level by turning on the transistor 109 in response to either of the D1′ or EOL′ terms going "false." The differentiating circuits 107 provide a total pulse interval of approximately 75 microseconds, initiating without substantial delay. Thus the PCB1 signal is initiated sooner than the P3 signal, but terminates later, as is needed for the 1620 system.

The sequence of functions provided by the control means of FIG. 4 may be better understood from a summary of the successive events which transpire in the transfer of a data character from the 1620 system into a command to the coupled plotter, together with the needed responses for the 1620 system. Initially, the return signal control circuit 68 provides an SCR control signal for the 1620 system which permits the output SCR's of the system which have received characters to fire, setting the associated data lines F0 to F4 "true." At least one of the F1 to F4 lines will indicate a "true" term for the data character, thus actuating the "AND" gate 80 to initiate the D1 relay 74. The input "AND" gate 84 to the interlock circuit is fully activated at this initial time. The D1′ term immediately goes "false" generating the P3 term from the transistor 99 after a 15 microsecond delay, and generating the PCB1 term from the transistor 109 without delay. The P3 term in turn, through the lines coupled from the collector of the transistor 103, provides an actuating clock to the output transistors 94 in the conversion circuits 90. These circuits 90 have previously translated the various data states F1 to F4 and F1′ to F4′ into the appropriate plotter commands.

The clock, the P3 term and PCB1 term all terminate within the 2.5 ms. interval of the D1 delay, and the 1620 system is thereby released for further computations. The trailing edge of the D1 pulse from the D1 delay 74 triggers the following D2 delay 75, to define another 2.5 ms. interval during which the plotter may complete an incremental movement. During these intervals, the input gate 84 to the interlock circuit is disabled, turning off the trigger interlock transistor 82, and preventing further data transfer.

If the plotter command is a pen up or pen down command, the D3 delay 76 and the D4 delay 77 are actuated successively, making a cumulative total delay of 100 ms. and disabling the input gate 84 for the interlock circuit for this interval. During this interval, however, whether or not the D3 delay 76 is triggered, the return signal control circuit 68 drops the voltage level on line 67 which controls the SCR's of the 1620 system. The SCR's are driven below the level required to hold them conducting, and are thus extinguished and enabled to receive a new data character. At the end of the D2 interval, SCR's which have received a "1" signal will be set "true" and fired to permit subsequent transfer of a command to the plotter in the manner previously described.

An EOL term provided from the 1620 system is responded to with P3 and PCB1 signals substantially immediately, but without actuation of the delays or the clock. The 1620 system also provides the "C" and "X" signals which do not contain plotter commands but which are to be responded to in a like manner, and which require corresponding time intervals. The "C" and "X" input terms are coupled together with the F0 term in an "OR" circuit 64 and coupled through an input gate 65 into the emitter circuit of the trigger interlock transistor 82, as an additional term along with the F1 to F4 terms which are applied to the "AND" gate 80.

Figures 5, 6:
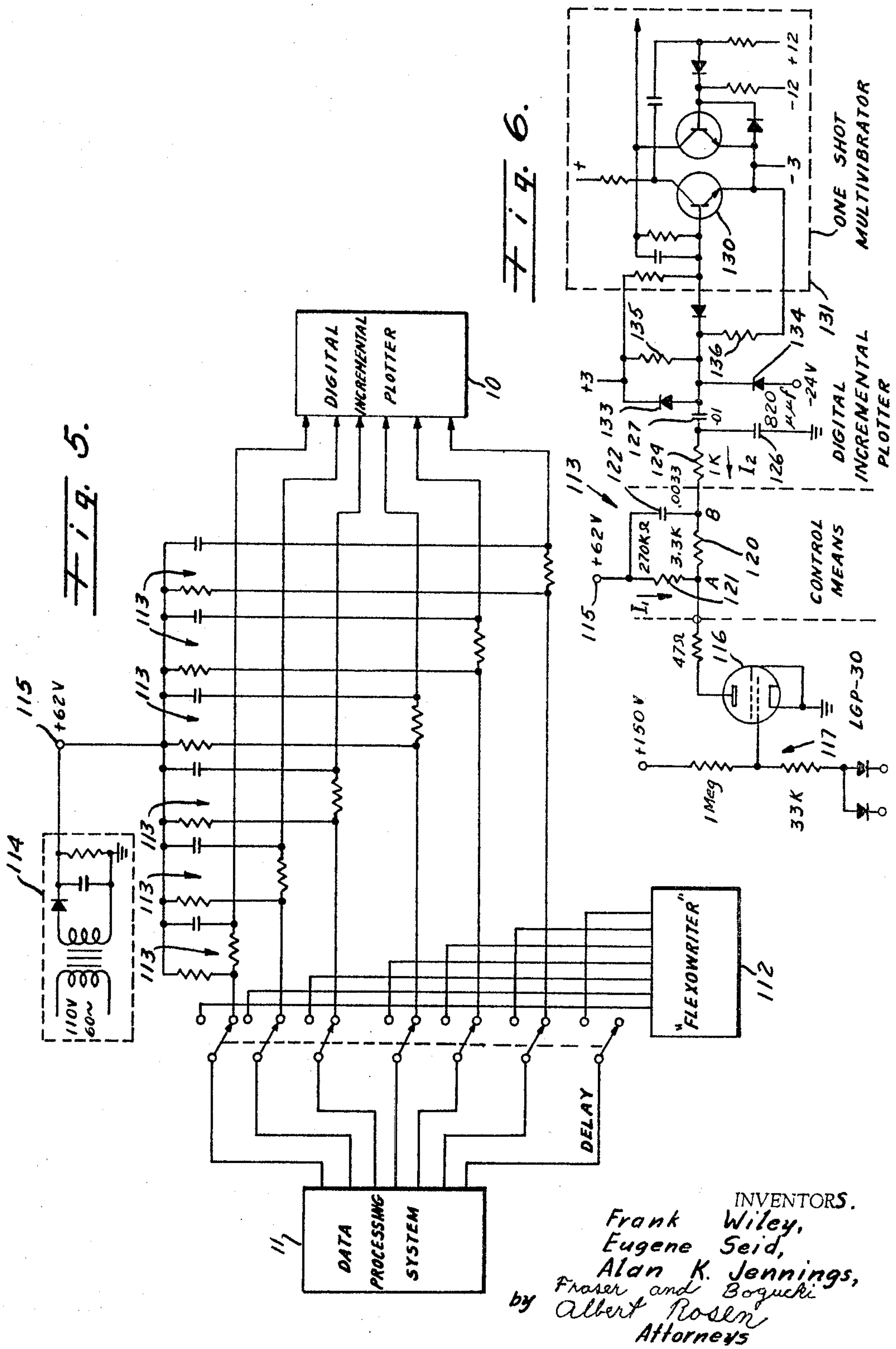
FIG. 5 is a combined schematic circuit and block diagram of yet another form of control means which may be employed in conjunction with a different type of data processing system.
FIG. 6 is a schematic circuit diagram of one arrangement of specific circuit elements in the system of FIG. 5.

FIGS. 5 and 6 illustrate a different form of control means in accordance with the inventon which selectively unites a digital incremental plotter to a data processing system of the type manufactured by the Librascope Division of General Precision Inc., and having the designation LGP–30. The LGP–30 presents a different type of problem, in that its computation rate and output data rates must be controlled by programming. Such systems provide output data for direct control of external devices, and are usually operated to control a computer printer such as a "Flexowriter." Accordingly, to control a digital incremental plotter, it is feasible to use different selected characters in the LGP–30 system code directly for control. The relationships of these characters to the typewriter characters and the resulting plotter action are set out below:

| Code | | | | | | Typewriter Character | Plotter Action |
|---|---|---|---|---|---|---|---|
| (Output Line No.) | | | | | | | |
| 1 | 2 | 3 | 4 | 5 | 6 | | |
| 0 | 0 | 0 | 0 | 0 | 1 | Z (or z) | +y |
| 0 | 0 | 0 | 0 | 1 | 0 | (or 0) | −y |
| 0 | 0 | 0 | 1 | 0 | 0 | Lower Case | +x |
| 0 | 0 | 1 | 0 | 0 | 0 | Upper Case | −x |
| 0 | 1 | 0 | 0 | 0 | 0 | Carriage Return | Pen Down |
| 1 | 0 | 0 | 0 | 0 | 0 | Conditional Step | Pen Up |
| 0 | 0 | 0 | 1 | 0 | 1 | B (or b) | +x +y |
| 0 | 0 | 1 | 0 | 0 | 1 | Y (or y) | −x −y |
| 0 | 0 | 0 | 1 | 1 | 0 | L (or l) | +x −y |
| 0 | 0 | 1 | 0 | 1 | 0 | * (or 2) | −x −y |

Using this arrangement, as shown in FIG. 5, a group of switches 110 may selectively couple the output lines from the data processing system 11 to either a digital incremental plotter 10 or to a "Flexowriter" 112. Because the codes are different for the two output devices, however, they cannot be controlled simultaneously by the data processing system 11.

The coupling between the data processing system 11 and the digital incremental plotter 10 includes a number of individual RC passive circuits 113 connected to power supply circuits 114 which appears as a +62 volt source 115 for the arrangement. Each of the output lines of the data processing system 11 is coupled to a different one of the six input lines of the digital incremental plotter 10 through a different RC circuit 113. A complex interrelationship exists, however, between the output circuit of the LGP–30 system, and the input circuit of the digital incremental plotter. The control means effectively coordinates the diverse requirements of these two circuits to control both the output circuit of the LGP–30 and the input circuit of the digital incremental plotter while also providing data transfer between them.

These relationships may be better understood from the schematic diagram of FIG. 6, which illustrates the final stage of the output circuitry of the LGP–30 as well as the input stage of the digital incremental plotter. The output circuit of the data processing system includes a thyratron 116 which is turned on by positive-going input signals provided from an input circuit 117 to its control grid. The plate circuit of the thyratron 116 is coupled to the RC circuit 113 of the control means. The RC circuit includes a limiting resistor 120 and a shunt resistor 121 and shunt capacitor 122 combination coupled to the +62 volt supply 115. As shown in FIG. 5 the +62 volt supply may comprise a half-wave rectifier with an output filter drawing power from a 110-volt 60-cycle line.

In the digital incremental plotter, the coupling from the RC circuit 113 is made through an input network including a resistor 124, a capacitor 125 and a shunt capacitor 126. These elements are coupled to the base of a first transistor 130 in a one-shot multivibrator 131, the input circuit being protected from excessive voltage swings by a pair of clamping diodes 133, 134 and established at a selected quiescent level by a series pair of resistors 135, 136. The values shown for the various circuit elements are of particular significance to the operation of this arrangement and therefore have been set out in detail. The control means is enabled thereby to turn off the thyratron 116 after triggering the one-shot multivibrator 131, and to do so without modification of either circuit and with utmost reliability at normal system operating speeds and slower.

When the thyratron 116 is not conducting, the voltages at points A and B have quiescent values of 62 volts. The thyratron 116 is turned on by a positive-going signal on its grid to draw current from the associated circuits. The plate current of the thyratron consists of two parts, $I_1$ (drawn from the +62 volts supply 115) and $I_2$ (drawn from the input circuit of the plotter). The voltage drop across the resistor 121 is approximately 55 volts, and the current $I_1$ is therefore about 0.20 milliampere. The current $I_2$ is the displacement current from the capacitor 126, but is limited by the resistors 124 and 120. The maximum value of $I_2$ cannot exceed 62 volts/4.3 kilohms or 14.4 ma. $I_2$ is actually significantly less than this value due to the impedance of the input network to the digital incremental plotter.

The decay time of $I_2$ has an apparent time constant of about:

$$T\text{ decay} \cong \left(R_{120}+R_{124}+\frac{R_{135}R_{136}}{R_{135}+R_{136}}\right)(C_{127}+C_{126}+C_{122})$$

$$\cong .014\times10^{-6}(3.3+1+4.65\times10^{-3})$$

$$\cong 125 \text{ microseconds}$$

After a few time constants of $I_2$, the sum of $I_1+I_2$ becomes sufficiently small that the thyratron 116 cannot maintain conduction when its control grid is negative. The control grid will be negative after the data signal has terminated. At this time, therefore, the thyratron 116 extinguishes, and the capacitor 127 is recharged through the resistance 121 in the RC circuit 113, with a time constant of:

$$T_{\text{VISC}} \cong \left(R_{121}+R_{120}+\frac{R_{135}R_{136}}{R_{135}+R_{136}}\right)\times(C_{127}+C_{126}+C_{122})$$

$$\cong 279\times10^{-3}(.014\times10^{-6})$$

$$\cong 3.9 \text{ milliseconds}$$

The trigger current of the one-shot multivibrator 131 is derived from the charge of the capacitor 127. If the digital incremental plotter is operated at its maximum speed of 200 steps per second for the appropriate model (3.3 ms. between steps), the rise time does not permit the capacitor 127 to fully recharge. Consequently, the trigger current applied to the base of the transistor 130 of the one-shot multivibrator 131 is reduced at high speeds. This does not detract from the performance of the digital incremental plotter, because more than sufficient trigger current is drawn at the maximum speed and the one-shot multivibrator regenerates the input signal. At low speeds, the trigger current is about 1.2 times the value at maximum speed for the 200 steps per second plotter with the values shown.

While this arrangement does not provide a release signal to permit the computer to engage in further data processing it does provide effective control of data transfer, as well as synchronization of the computer with the plotter, in a manner comparable to the systems of FIG. 2 and FIG. 4. The thyratron 116 of the LGP–30 system is effectively used for data storage and the storage is cleared or erased by the thyratron 116 being returned to the non-conductive state. Gating of the command into the one-shot multivibrator 131 of the plotter is accomplished by the initiation of conduction in the thyratron 116.

The recharging time of the input circuit to the one-shot multivibrator 131 is rendered fast enough by the RC circuit 113 in the control means to permit normal operation of the plotter without the use of active circuit elements, a buffer storage, or any other similar expensive added circuitry.

*Multiple plotter operation*

Figures 7, 8:
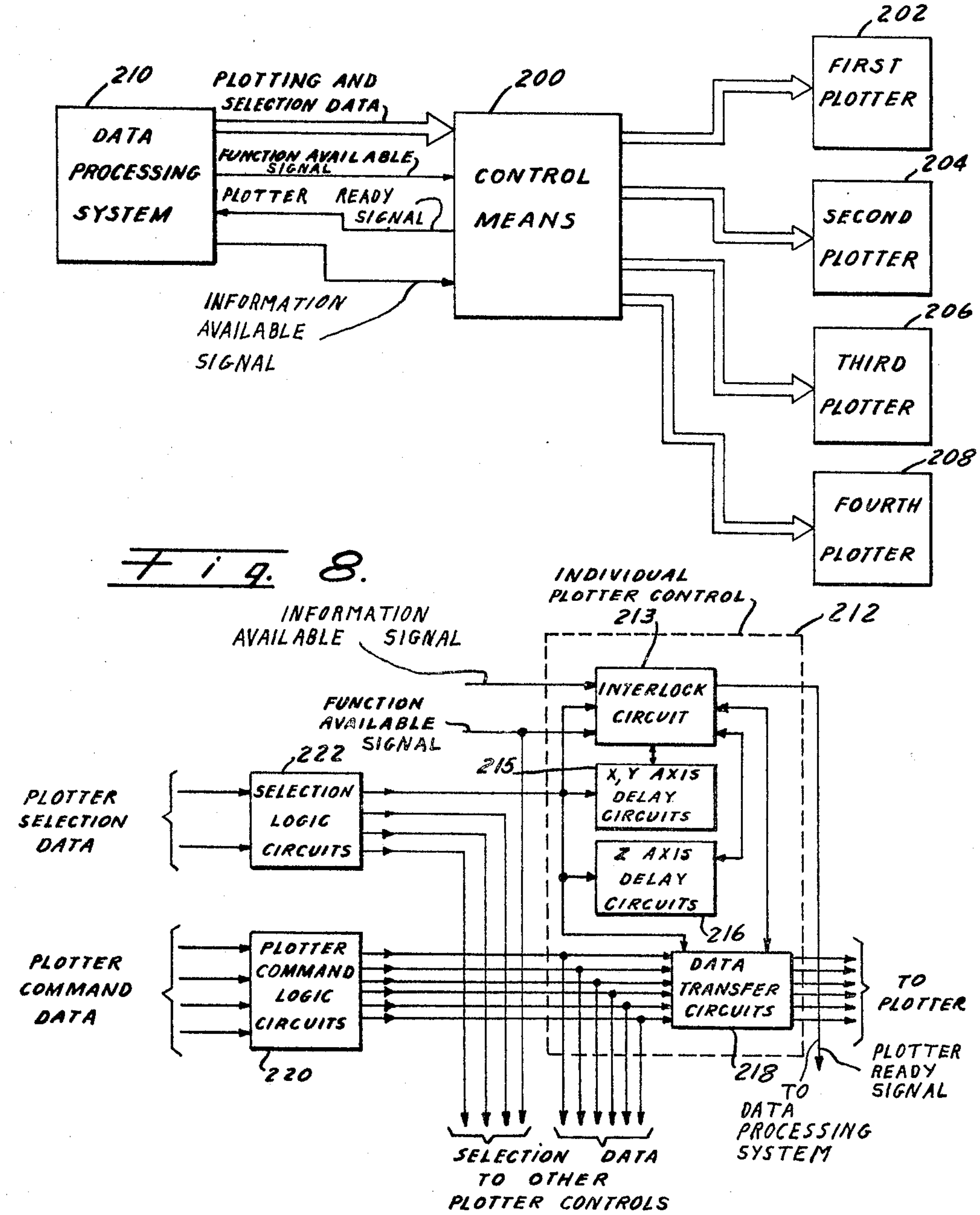
FIG. 7 is a block diagram of a system involving the operation of a number of independent digital incremental plotters from single data processing system.
FIG. 8 is a block diagram showing details of parts of the systems of FIG. 7.

A further aspect of this invention relates to the provision of on-line operation of a number of digital incremental plotters from a single digital computer or other data processing source. As is shown by the arrangements of FIGS. 7 and 8, an arbitrary number of plotters may be driven at full speed and directly from data processing system by the use of control means 200 which provides a multiplexing operation. First through fourth plotters 202, 204, 206 and 208 respectively may be operated from a single data processing system 210. The arrangement is generally shown in FIG. 7, while details of the selection circuitry and data transfer and timing control within the control means 200, as applied to an individual channel, are shown in FIG. 8. In the system described with respect to FIGS. 7 and 8, the data processing system 210 may, for example, be the type CDC 160A medium scale general purpose digital computer manufactured by the Control Data Corporation of Minneapolis, Minn., or the type AN/UYK–1 medium scale general purpose digital computer manufactured by Ramo-Wooldridge, a division of Thompson Ramo Wooldridge Inc., Canoga Park, Calif.

In FIG. 7, output characters from the data processing system, representing plotting and selection data, are provided to the control means 200. Only the plotting command data is coupled to the various plotters 202, 204, 206 and 208, and these command signals are applied to only one plotter at a time. In the system exemplified in FIG. 7, the plotting system as a whole is activated by a function available signal provided from the data processing system 210. Once this signal is provided to the control means 200, and an individual plotter is selected, a "plotter ready" signal (designated to correspond to the comparable signal in the system of FIG. 2) is returned to the data processing system 210, which responds with the data signals and an "information available" signal as previously described. Only that plotter and its associated control means which are active generate and use such signals for an individual command.

Within the control means 200, each individual plotter control 212 (FIG. 8) includes an interlock circuit 213, X, Y axis delay circuits 215, Z axis delay circuits 216, and data transfer circuits 218, corresponding to the principal functional units of the control means previously described. The data transfer circuits 218 may be simplified, however, inasmuch as code conversion of plotter command data may be made at a central location by plotter command logic circuits 220. The coding format of the output characters from the data processing system 210 may be as previously described. For a four plotter simultaneous operation, however, the two or more additional bits previously unused are employed by the programmer for the data processing system for control of the selection of the individual plotters. Two binary digits are sufficient for successive selection of each of the four plotters through the use of selection logic circuits 222 which may be of conventional form.

With this arrangement, the common plotter command logic circuits 220 and selection logic circuits 222, together with the "function available" and the "information available" signals from the data processing system and the "plotter ready" signals which are returned to the data processing system, operate the individual plotter control 212 to achieve simultaneous plotting operation of each of the associated plotter mechanisms. The sequence which is employed is as follows for a typical operation of four plotters:

(1) Plotter selection data signals for controlling the operation of the first plotter 202 is placed on the lines coupled to the selection logic circuits 222, and the individual plotter control 212 for the first plotter is energized. Concurrently, the "function available" signal is provided.

(2) The first plotter 202 is selected and prepared for reception of command within approximately 50 microseconds after receipt of the coded signal, and returns a "plotter ready" signal to the data processing system 210 of FIG. 7.

(3) The binary coded signals representative of the data to be plotted are applied to the plotter command logic circuits 220, and thence as a plotter command to the data transfer circuits 218, at which time "information available" signal is also provided.

(4) Within approximately 50 microseconds after energization of the information available line, the plotting data command is gated from the data transfer circuits

218 to the plotter, and the "plotter ready" line is energized again, indicating the availability of the plotter control 212 for a further data signal.

(5) Steps 1–4 are then repeated for the second, third, and fourth plotters 204, 206, and 208, respectively, at which point in time a following command is provided to the individual plotter control 212 for the first plotter.

This process can be repeated for X axis and Y axis plotting signals in approximately 3 microseconds, which is essentially the cycle time of one of the plotters. The data for four plotters is therefore transmitted in a total of about 400 microseconds, the processing system 210 being released to continue with its main program. If a given plotter is selected and a data character is transmitted before the cycle of the plotter is completed, its interlock circuit 213 prevents return of a "plotter ready" signal until the character can be received, as described above.

Other modes of operation and arrangement of the elements are also feasible. For example, if the plotting commands are transmitted sequentially in each instance, plotter selection signals need not be employed. Instead, the plotter selection circuitry and the control means can automatically step sequentially from one plotter to the next upon receipt and transfer of each data character.

It will be appreciated that other digital computer systems may be substituted for the data processing system 210 described with respect to FIG. 7 with but minor modifications of the overall system circuitry. For example, if the system of FIG. 7 is to be used with an IBM 1401, IBM 1410, or IBM 1620 computer, the "function available" line connected between the data processing system 210 and the control means 200 is dispensed with since the IBM 1401, IBM 1410 and IBM 1620 computers send plotter selection and command signals simultaneously in the form of several bit codes. In one multiple plotter operation system constructed in accordance with the invention, the data processing system 210 took the form of a Philco S–2000 large scale digital computing system. In the latter case, the data processing system included the Philco S–2000 computer and its associated buffer system, where data from the computer was stored in the buffer, and then transmitted over the lines to the control means 200.

While there have been described above and illustrated in the drawings various forms of graphical plotting systems in accordance with the invention, it will be recognized that a number of alternative arrangements are also feasible. Accordingly, the invention should be considered to include all modifications, variations and alternative forms falling within the scope of the appended claims.

We claim:

1. A data processing system providing graphical output representations and comprising: data processor means for performing computations, the data processor means including program means for controlling the computation results to provide instructional data in the form of sequences of binary coded patterns provided at a high data transfer rate; incremental recorder means having a number of separate input terminals for receiving signals for the control of individual recording variables, the incremental recorder means having a much lower data transfer rate than the data processor means; and means responsive to selected ones of the characters from the data processor means and coupling the data processor means on-line to the incremental recorder means to provide successive controlled recording movements thereby at a rate compatible with that of the incremental recorder means.

2. A data processing system providing plotted records and comprising: data processor means providing binary output characters at a relatively high data rate; at least one digital incremental plotter means having a number of individually actuable input terminals and operative at a low data rate relative to the data rate of the data processing system; and control means coupled to transfer output characters on-line from the data processor means to the digital incremental plotter means, the control means being coupled to control the timing of successive output characters from the data processor means.

3. A data processing system providing graphical output plots of continuous and discontinuous data and comprising: a data processing system having a high output data rate, the output data from the data processing system being provided in the form of binary coded characters on parallel output terminals, incremental recorder means having a relatively lower input data rate than the output data rate of the data processing system and a number of input terminals each controlling a different incremental movement, and means coupling selected output terminals of the data processing system on-line to the input terminals of the incremental recorder means and cooperating with the incremental recorder means to provide substantially simultaneous control of more than one movement of the incremental recorder means.

4. A data processing system providing graphical output plots of continuous and discontinuous data and comprising a data processing system having a high output data rate, the output data from the system being provided in the form of binary coded characters on parallel output terminals, and the system requiring a release control signal for the provision of successive characters, digital incremental potter means having a substantially lower input data rate than the output data rate of the data processing system and a number of input terminals for receiving individual signals each controlling a different incremental movement, and control means coupling selected output terminals of the data processing system to the input terminals of the digital incremental plotter means for concurrent operation of the plotter means under control of the data processing system, the control means being responsive to the transfer of a character to apply a release control signal to the data processing system.

5. A data processing system providing graphical output plots of continuous and discontinuous data and comprising a data processing system having a high output data rate, the output data from the data processing system being provided on parallel output terminals, digital incremental plotter means having a relatively lower input data rate than the output data rate of the data processing system and a number of input terminals for receiving different individual commands, and control means responsive to the content of the data and coupling the data processing system to the digital incremental plotter to effect transfer of data thereto concurrently with operation of the data processing system, the control means including means for directly applying command signals to the plotter.

6. A data processing system providing arbitrarily selected plots of continuous and discontinuous data and comprising a data processor having a high output data rate capability, the data processor including means for controlling the data rate, at least one digital incremental plotter means having a relatively lower input data rate capability than the output data rate capability of the data processor without means for controlling the data rate, the digital incremental plotter means also including a number of individually actuable input means for receiving separate commands, and control means responsive to data from the data processor and coupling the data processor to the digital incremental plotter to effect command thereof during operation of the data processing system, the control means being coupled to provide control signals to the means for controlling the data rate within the data processor.

7. A system for controlling a relatively lower speed output device in cooperative and on-line relationship with a relatively higher speed computing device, the output device having two different operating cycles, the system comprising means responsive to the data from the computing device for transferring converted instructions to the output device, means responsive to the initiation of the transfer for releasing the computing device at a selected time thereafter, and means responsive to the means for releasing to block transfer of further data for different controlled times dependent upon the data itself.

8. A system for controlling an output device having at least two cyling times dependent upon the commands thereto with characters from a data processing system having a relatively higher operating rate, the system including means responsive to each character for generating individual commands for the output device, means responsive to each command for initiating a timed cycle having one of two durations dependent upon the command given, and means responsive to the timed cycle for (1) releasing the data processing system (2) transferring the command and (3) blocking the transfer of a further command until the timed cycle is completed.

9. A system for controlling an incremental plotter in cooperative relationship with a high speed data processing system, the plotter having two different characteristic incremental rates dependent upon the plotter commands, and the data processing system requiring response signals for the provision of further data, the system comprising means responsive to data from the data processing system for transferring commands to the plotter, means responsive to the initiation of transfer for releasing the data processing system at a fixed time interval thereafter, means responsive to the commands for operating the means for transferring to block acceptance of further data for first or second controlled time intervals dependent upon the content of the commands.

10. A system for controlling a digital incremental plotter in cooperative relationship with a high speed data processing system, the plotter having two different characteristic incremental rates dependent upon the plotter commands, and the data processing system requiring response signals for the provision of further data, the system comprising data conversion means responsive to data from the data processing system for transferring commands to the plotter, the data conversion means including gating means, means responsive to the provision of data for providing a response signal at a fixed time interval thereafter, control means responsive to the provision of data for operating the gating means at a fixed time interval thereafter, means responsive to a first type of command for locking out the control means for a first selected time interval, and means responsive to the second type of command for locking out the control means for a second selected time interval.

11. A system for controlling a digital incremental plotter in cooperative relationship with a high speed data processing system, the plotter having two different characteristic incremental rates dependent upon the plotter commands, and the data processing system providing individual binary coded characters and requiring response signals for the provision of each further character, the system including data conversion means responsive to characters from the data processing system for transferring commands to the plotter, the data conversion means including gating means, means responsive to the provision of a character for providing a response signal at a fixed time interval thereafter, interlock control means responsive to the provision of a character for operating the gating means at a fixed time interval thereafter, first delay means responsive to a first type of command for operating the interlock means to prevent passage of a command for a first selected time interval, and second delay means responsive to the second type of command for operating the interlock means to prevent passage of a command for a second selected time interval.

12. A system for controlling a data output device having two operating cycles occurring in random sequence dependent upon two different classes of coded instructions from a data processor having a substantially higher data transfer rate than the data output device, comprising: means for distinguishing instructions of one class from the other, gating means coupled to receive the coded instructions, data register means coupled to the gating means and coupled to transfer the instructions to the output device, timing control means responsive to entry of coded instructions into the data register means for providing selectively spaced timing pulses thereafter, and means responsive to the coded instructions for coupling selected ones of the timing pulses to control the gating means.

13. A system for controlling a data output device having two different operating cycles dependent upon two different classes of character instructions provided from a data processing system normally providing characters at a substantially faster rate than the rate of operation of the data output device, comprising: means responsive to the characters from the data processing system for distinguishing plotter commands of one class from the other, storage means, including gating means, coupled to receive the characters from the data processing system, gated code conversion means coupling the storage means to the plotter, timing control means responsive to the entry of characters into the storage means for distinguishing commands and to the initiation of a timing cycle for controlling the gating means of the storage means to disable the gating means for selected intervals.

14. A system for controlling a plotter device having different operating rates for different plotter movements in response to data characters provided from a data processor having a substantially higher data transfer rate and requiring response signals, the system comprising code conversion circuits for converting the data characters to plotter commands, gating circuits coupling the code conversion circuits to the plotter, data transfer means coupling the data processor to the code conversion means, interlock means responsive to the provision of a data character from the data processor and to control signals for providing (1) a first signal applied to the data transfer means to transfer the data character, (2) a second signal applied to the gating circuits to transfer commands to the plotter, (3) a third signal applied as a response signal to the data processor, and delay means responsive to the nature of the plotter commands and providing control signals to the interlock means to define (*a*) a first time interval dependent upon one type of plotter movement and (*b*) a second time interval dependent upon the second type of plotter movement.

15. A system for controlling a digital incremental plotter having two different incremental operating speeds used in random sequence in response to specific coded instructions received on-line from a data processor having a substantially higher data transfer rate and providing binary coded decimal data characters, comprising: means responsive to the data characters from the data processor for identifying two different classes of commands for the plotter, gating means coupled to receive the data characters, data register means coupled to the gating means, code conversion means coupled to the data register means and providing plotter commands, timing control means responsive to the provision of a data character from the data processor for entering the data character into the data register means, the timing control means including timed pulse generating means providing selectively spaced timing pulses thereafter, means responsive to the selectively spaced timing pulses for providing a response pulse to the data processor, means responsive to the selectively spaced timing pulses and coupling the code conversion circuits to the digital incremental plotter for controlling transfer of the commands to the plotter, the commands generated in response to an individual character being transferred simultaneously, and means responsive to the data characters and to the selectively spaced timing pulses for operating the gating means to prevent transfer of data characters to the data register means for a first or second time interval, dependent upon the plotter commands, following the previous data character.

16. A system for controlling a data output device having two operating cycles occurring in random sequence dependent upon two different classes of coded instructions received on-line from a data processing system, having a substantially higher data transfer rate, the data processing system being of the type having extinguishable output devices, the system including means responsive to the instructions from the data processing system for distinguishing instructions of one class from the other, gated means responsive to the instructions from the data processing system for coupling converted commands to the plotter, timing control means responsive to the provision of an instruction from the data processing system for generating selectively spaced timing pulses thereafter, means controlling the gated code conversion means with specific ones of the timing pulses, and means responsive to the timing pulses for coupling selected ones of the timing pulses to extinguish the output devices of the data processing system.

17. Control means for operating a digital incremental plotter having two operating rates on-line in response to a data processor providing successive output data characters in binary coded decimal form, the normal data transfer rate of the data processor being substantially higher than that of the digital incremental plotter, the data processor requiring response signals and having deactivatable output devices, the system comprising first means coupled to the output terminals of the data processor for deactivating the output devices therein, gated code conversion means coupled to the input terminals of the digital incremental plotter, input gating means coupling the output terminals of the data processor to the gated code conversion means, and timing control means responsive to the initiation of transfer of a data character and the nature of the data character for operating the first means and the gated code conversion means in a timed cycle, the timing control means including means for preventing further data transfer for at least two different time intervals dependent upon the plotter command represented by data characters provided from the data processor.

18. The invention as set forth in claim 17 above, wherein the data processor includes silicon-controlled-rectifiers, and the first means includes means for controlling firing of the silicon-controlled-rectifiers, wherein the timing control means generates clock pulses, and wherein the gated code conversion means includes output gates operating in response to the clock pulses and the plotter commands.

19. A system for driving a one-shot multivibrator which provides actuating pulses for an incrementally movable plotter, in response to output signals provided on-line from a data processor, the data processor including thyratron output means, said system comprising: first passive circuit means coupled to the multivibrator for providing trigger current to the multivibrator when discharging, and second passive circuit means coupling the main conduction path of the thyratron output means of the data processor to the first passive circuit means, for limiting conduction in the thyratron means in the absence of a signal to less than the firing level of the thyratron means and permitting the first passive circuit means to recharge.

20. The invention as set forth in claim 19 above, wherein both passive circuit means are in the main conduction path of the thyratron output means.

21. A graphical plotting system comprising a data processing system; a plurality of digital incremental plotters having variable cycling times; and control means coupling the data processing system on-line to each of the digital incremental plotters, the control means including means for selecting individual plotters and means for transferring data commands to the plotters at a rate not in excess of plotter cycling time as determined by the previous data command.

22. A graphical plotting system comprising a data processing system providing data characters at a relatively high rate and requiring response signals after each character, a plurality of digital incremental plotters each operating at a relatively low data rate and each having two different cycling times dependent upon the commands thereto, a plurality of control means, each associated with a different one of the plotters and each including means for transferring data in the form of commands to the associated plotter, and means responsive to the commands for disabling the means for transferring for one of two time intervals dependent upon the nature of the plotter commands, and the system also including means coupled to receive characters from the data processing system and coupled to each of the control means for transferring data thereto.

23. A system for providing a plurality of graphical plots from successive data characters provided on-line from a data processing system and comprising a plurality of digital incremental plotters, a plurality of control means, each providing data transfer couplings to a different one of the plotters and each coupled to receive characters from the data processing system, each of the control means including interlock means responsive to the cycling time of the associated plotter for limiting acceptance of a succeeding data character, and means coupled to each of the control means for selecting individual ones of the control means for data transfer.

References Cited by the Examiner

UNITED STATES PATENTS

| | | | |
|---|---|---|---|
| 2,922,940 | 1/1960 | Mergler | 318—162 |
| 3,069,608 | 12/1962 | Forrester et al. | 318—162 |
| 3,127,678 | 4/1964 | Muldoon | 33—1 |
| 3,143,804 | 8/1964 | Muldoon | 33—18 |

MAYNARD R. WILBUR, *Primary Examiner.*

DARYL W. COOK, MALCOLM A. MORRISON, *Examiners.*

W. J. ATKINS, *Assistant Examiner.*

UNITED STATES PATENT OFFICE

CERTIFICATE OF CORRECTION

Patent No. 3,278,926 October 11, 1966

Franklyn L. Wiley et al.

It is hereby certified that error appears in the above numbered patent requiring correction and that the said Letters Patent should read as corrected below.

Column 1, line 18, for "well-known" read -- well known --; column 2, line 12, after "which" insert -- may --; column 3, line 66, for "diagrams" read -- diagram --; column 4, line 8, for "arbitarary" read -- arbitrary --; column 4, line 11, strike out "of"; line 14, strike out "so"; line 34, strike out "is"; column 5, line 59, for "well-known" read -- well known --; column 6, line 18, for "a" read -- an --; column 7, line 4, for "stage" read -- state --; column 10, line 14, after "note" insert a comma; line 34, for "+24-volt" read -- +24 volt --; column 13, line 8, for "nonconducting" read -- non-conducting --; line 68, for "cause" read -- causes --; column 14, line 13, for "relay" read -- delay --; column 15, line 28, for "appears" read -- appear --; column 16, line 28, for "$10^{-3}$" read -- $10^{3}$ --; line 72, for "system" read -- systems --; column 19, line 27, for "potter" read -- plotter --; column 20, line 6, for "cyling" read -- cycling --.

Signed and sealed this 5th day of September 1967.

(SEAL)
Attest:

ERNEST W. SWIDER
Attesting Officer

EDWARD J. BRENNER
Commissioner of Patents